I. A. PAINE.

Ball-Trap.

No. 9,042. Reissued Jan. 13, 1880.

WITNESSES

Robert Emmett

J. F. Ackerly

INVENTOR

Ira A. Paine by

W. H. Babcock

ATTORNEY

UNITED STATES PATENT OFFICE.

IRA A. PAINE, OF NEW YORK, N. Y.

BALL-TRAP.

SPECIFICATION forming part of Reissued Letters Patent No. 9,042, dated January 13, 1880.

Original No. 175,870, dated April 11, 1876; Application for Reissue filed December 12, 1879.

*To all whom it may concern:*

Be it known that I, IRA A. PAINE, of New York, in the county of New York and State of New York, have invented certain new and useful Improvements in Ball-Throwers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The object of my invention is to produce a machine for throwing balls, which I prefer to make of glass, in any desired direction, to be shot at with a shot-gun, to teach and practice pigeon-shooting.

Figure 1:
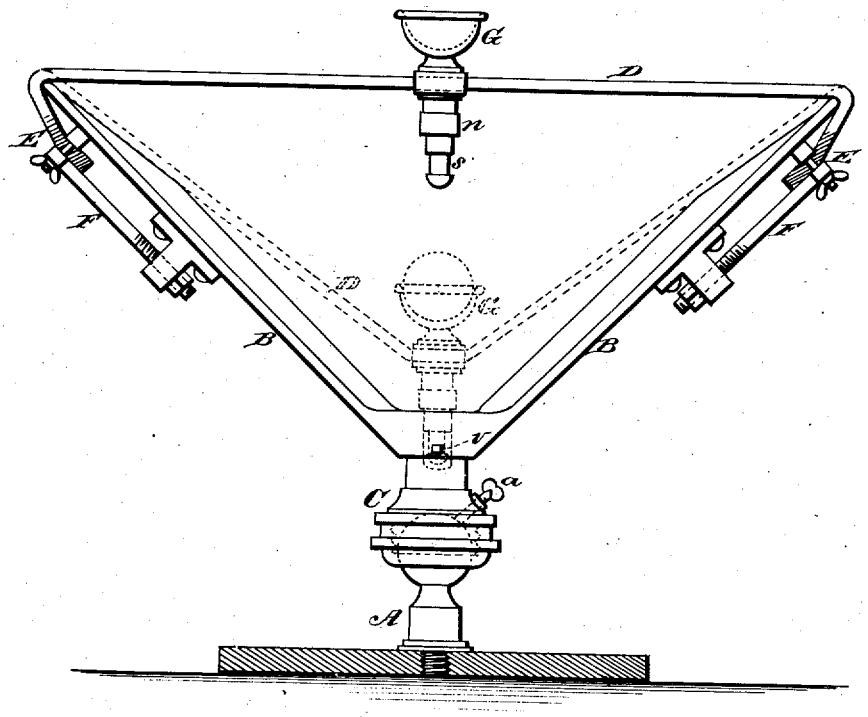
Figure 2:
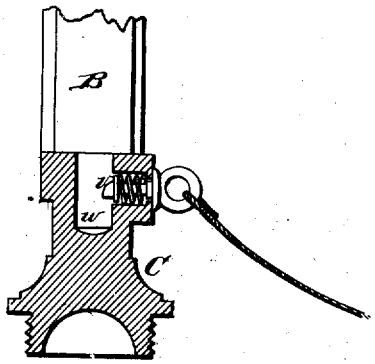

In the accompanying drawings, Figure 1 represents a front view of the machine embodying my invention. Fig. 2 is a cross-section of a part of the same.

A is the stand or base of the machine, and B the frame, consisting of two diverging arms joined near the bottom. This frame B is attached to the base or stand A by means of a ball-joint, C, arranged with a suitable set-screw, *a*, to fasten and fix the frame at any desired angle or inclination. Over the ends of the arms elastic bands or cords D are stretched, fastened to screw-clamps E, provided with bolts F, to attach the same to lugs or projections *m*, fast to the outsides of the arms.

By this arrangement the elastic cords or bands D may, by means of these bolts F, be stretched more or less, as may be desired, and consequently the ball be thrown with greater or less velocity.

In the center of the elastic cords a cup, G, is firmly secured, the foot or end *n* of which fits into a corresponding hole, *w*, in the lower part of the frame B. In this hole *w* a spring-catch, *v*, is arranged, whose ends fit into the recess *s* in the foot *n* of the cup G. To the outer projecting end of this spring-catch *v* a cord is attached, for the purpose of pulling said catch *v* out of the recess *s*, and thus liberating the cup G, so as to be acted upon by the power of the elastic cords.

The operation of the machine is as follows: The cup G is pressed downward, so that its foot *n* enters the hole *w* in the lower part of the frame B, and is there held fast by the spring-catch *v* entering the recess *s* in the foot *n* of the cup. The ball to be thrown is then placed in the cup G, as shown in dotted lines, Fig. 1. When the string attached to the outer end of the catch *v* is pulled the cup G will be liberated, when the action of the elastic cords D will force the cup G, together with its ball, upward, and thus propel or throw the latter a considerable distance, to act as a target for the person to shoot at, similar to the rising of pigeons out of a trap.

What I claim, and desire to secure by Letters Patent, is—

1. A ball-thrower or spring-trap for throwing target-balls provided with a rotary adjustable frame carrying a spring and a ball-cup, in combination with a suitable catch and withdrawing device, substantially as and for the purpose set forth.

2. The combination of a frame, B, having diverging arms, with elastic cords D, provided with a cup, G, or a similar receptacle for a ball, attached in their center, and the spring-catch *v*, entering a recess or hole, *w*, in the bottom of the frame, substantially as and for the purpose described.

3. In combination with a frame, B, provided with elastic cords D, the screw-clamps E and tightening-bolts F, arranged in the manner and for the purpose set forth.

In testimony that I claim the foregoing I have hereunto set my hand this 30th day of October, 1879.

Signed at Detroit, Michigan.

IRA A. PAINE.

Witnesses:
E. H. GILLMAN,
H. F. PIERCE.